United States Patent [19]

Lang

[11] Patent Number: 4,795,110
[45] Date of Patent: Jan. 3, 1989

[54] FLIGHT CONTROL SURFACE ACTUATION LOCK SYSTEM

[75] Inventor: David J. Lang, Rockford, Ill.
[73] Assignee: Sundstrand Corporation, Rockford, Ill.
[21] Appl. No.: 947,701
[22] Filed: Dec. 30, 1986
[51] Int. Cl.⁴ .................................. F42B 15/027
[52] U.S. Cl. .............................. 244/3.24; 244/3.21
[58] Field of Search .............. 244/3.21, 3.24, 3.22, 244/3.1, 3.25, 3.26, 3.27, 3.28, 3.29, 3.3, 224

[56] References Cited

U.S. PATENT DOCUMENTS

| | | | |
|---|---|---|---|
| 3,093,075 | 6/1963 | Garrett et al. | 244/3.21 |
| 3,102,437 | 9/1963 | Geyer | 74/752 |
| 3,112,902 | 12/1963 | Knogelbeck | 244/3.21 |
| 3,196,794 | 7/1965 | Meade | 244/3.21 |
| 3,355,130 | 11/1967 | Dell | 244/3.21 |
| 3,690,596 | 9/1972 | Durran et al. | 244/3.21 |
| 3,697,019 | 10/1972 | Watson | 244/3.29 |
| 3,711,040 | 1/1973 | Carver | 244/3.21 |
| 3,759,466 | 9/1973 | Evers-Euterneck | 244/3.21 |
| 4,141,520 | 2/1979 | Beijer et al. | 244/224 |
| 4,163,534 | 8/1979 | Seeger | 244/3.22 |
| 4,210,298 | 7/1980 | Liberman | 244/3.21 |
| 4,373,688 | 2/1983 | Topliffe | 244/3.24 |
| 4,440,360 | 4/1984 | Hallström | 244/3.28 |
| 4,568,041 | 2/1986 | Whitham | 244/3.25 |
| 4,575,025 | 3/1986 | Sadvary et al. | 244/3.27 |

FOREIGN PATENT DOCUMENTS 3509400 9/1986 Fed. Rep. of Germany ...... 244/221

Primary Examiner—Deborah L. Kyle
Assistant Examiner—Michael J. Carone
Attorney, Agent, or Firm—Wood, Dalton, Phillips, Mason & Rowe

[57] ABSTRACT

In order to provide for the releasable locking and reversible actuation of a control surface, where the control surface is normally locked but can be released in a nearly frictionless manner, the flight control system includes a shaft disposed within a shaft-receiving socket for carrying the control surface. The shaft is operatively associated with the shaft-receiving socket for rotational movement therewith which rotational movement is imparted through the shaft-receiving socket for moving the control surface by a motor or the like. Additionally, the flight control system includes an operating mechanism for releasably locking the control surface in a selected position including a detent integral with the shaft-receiving socket and also including a latch carrying a roller bearing mounted for pivotal movement of the roller bearing for locked engagement with the integral detent.

26 Claims, 2 Drawing Sheets

FLIGHT CONTROL SURFACE ACTUATION LOCK SYSTEM

FIELD OF THE INVENTION

The present invention relates to a flight control system and, more particularly, to a system for locking and actuating a missile fin.

BACKGROUND OF THE INVENTION

Flight control systems of many diverse types have been widely utilized. They generally include a control surface and, in the case of a missile, the control surface is typically a fin. Generally, the control surface or fin is movable for purposes of flight control.

Generally speaking, it is recognized as being desirable to be able to lock the control surface in a selected position. The lock is typically designed to hold the control surface or fin at a null position from which it is released only on command from a controller. In the case of a missile, it is critical for the lock to disengage for proper deployment of the fin upon command.

Ideally, the lock would be resettable to permit the portion of a system that actuates the fin to undergo pre-launch testing. Such a resettable lock should be releasable in a low friction fashion and yet reengageable in a locked position to maintain the control surface or fin at the null position until launch. At that point, the controller should again be able to release the lock upon command to reposition the control surface or fin for flight.

Unfortunately, most locks for control surfaces have failed in numerous respects. For instance, some locks have been prone to sticking or otherwise failing to release upon command in a substantially frictionless fashion and nearly every lock has failed to even contemplate the possibility of a relatching system which would allow the operability of the overall flight control system to be tested during countdown while at the same time permitting automatic resetting without manual replacement of component-parts. Moreover, some locks have been prone to inadvertent unlatching due to vibration during normal operation.

Among the wide range of attempts to deal with these problems is that disclosed in Topliffe U.S. Pat. No. 4,373,688 which utilizes a latch pin for a canard drive mechanism which is withdrawn from a mating hole to begin deflecting a pair of deflectable canards once despinning reduces centrifugal force to a relatively low value.

Also, Geyer U.S. Pat. No. 3,102,437 has proposed an electromechanical actuator for positioning aerodynamic control surfaces which utilizes a releasable noback means to permit rotation of a planet carrier for ultimate adjustment of output shafts.

Sadvary et al U.S. Pat. No. 4,575,025 proposes a fin deployment mechanism utilizing a pair of screw nuts, each of which is provided with a cam slot for receiving a cam follower mounted on the fin member to cause the fin to rotate through a given angle.

Watson U.S. Pat. No. 3,697,019 proposes a latch mechanism including a locking lug on the fin and a slot in the shroud to receive both the lug and a lug locking wedge to prevent movement of the fin in any direction from an erected position.

Liberman U.S. Pat. No. 4,210,298 proposes a plurality of solenoids operatively positioned relative to a rotary cam member and selectively activated to incline a torque producing lever-ball joint assembly to rotate wing panels in a desired direction.

Clearly, while many of these references relate in a general sense to locking systems for flight control surfaces, there has yet to be a reversible, low-friction locking means successively overcoming the above-stated problems.

The present invention is directed to overcoming the above-stated problems and accomplishing the stated objects.

SUMMARY OF THE INVENTION

Accordingly, the present invention is directed to a flight control system utilizing a control surface carried by a shaft disposed within a shaft-receiving socket. The shaft is operatively associated with the shaft-receiving socket for rotational movement therewith. Means are provided for imparting rotational movement to the shaft through the shaft-receiving socket for moving the control surface and means are provided for releasably locking the control surface in a selected position. The releasable locking means includes a detent integral with the shaft-receiving socket and latch means mounted for pivotal movement into and out of locked engagement with the integral detent. With these features, the present invention is particularly well-suited in a system for locking and actuating a missile fin.

In an exemplary embodiment, the latch means comprises a support beam mounted for pivotal movement remote from one end thereof and includes bearing means operatively associated with the one end thereof. The bearing means is movable into and out of engagement with the integral detent in low friction fashion. Also, means are provided for normally biasing the support beam such that the bearing means is normally urged into locked engagement with the integral detent and means are provided for selectively biasing the support beam such that the bearing means is selectively urged out of locked engagement with the integral detent. The normal biasing means is a torsion spring and the selective biasing means is a solenoid having at least one, and preferably but not necessarily, a pair of coils of differing impedance. With this arrangement, the solenoid acts against the torsion spring to urge the bearing means out of locked engagement with the integral detents when the coil(s) is energized.

Further, the solenoid also acts against the torsion spring to maintain the bearing means out of locked engagement with the integral detent. Preferably, the bearing means is a needle roller bearing integral with the one end of the support beam which is mounted for pivotal movement on bearing means intermediate the ends thereof and the support beam has a counterweight operatively associated with the other end thereof. Additionally, the bearing means i maintained out of locked engagement with the integral detent with only the higher impedance of the coils energized.

In the preferred embodiment, the integral detent is disposed on the periphery of the shaft-receiving socket. The integral detent preferably includes an opening facing outwardly away from the shaft-receiving socket Moreover, the outwardly facing opening is advantageously defined by a pair of outwardly diverging walls.

With features as defined hereinabove, the solenoid preferably engages the end of the support beam having the counterweight. The torsion spring then causes the support beam to pivot about the bearing means intermediate the ends thereof when the solenoid is de-energized. Still further, the torsion spring causes the needle roller bearing to be biased back into locked engagement with the integral detent.

Still additional details include a generally arcuate surface extending from the outermost extremes of each of the outwardly diverging walls for engagement by the needle-roller bearing upon de-energizing the solenoid with the control surface out of the selected position. With this construction, the needle roller bearing can engage one of the generally arcuate surfaces for rolling movement therealong in response to rotational movement of said shaft-receiving socket until the control surface is in the selected position when the needle roller bearing will again be received in the integral detent.

In the preferred embodiment, the movement imparting means includes a motor operatively associated with a ballscrew adapted to linearly translate a ballnut and integral rack gear. The movement imparting means further includes an integral socket sector gear adapted to be driven by the rack gear and includes a position feedback resolver and commutation resolver. With the motor having windings adapted to be excited in proper sequence by the position feedback resolver and commutation resolver, the motor can also be operatively associated with the ballscrew through a pinion and spur gear mechanism.

Preferably, a secondary sector gear integral with the shaft-receiving socket is also provided to drive an anti-backlash gear integral with the position feedback resolver. With this arrangement, the secondary sector gear cooperates with the position feedback resolver to relocate the control surface in the selected position.

Other objects, advantages and features of the present invention will become apparent from the following specification taken in conjunction with the accompanying drawings.

DETAILED DESCRIPTION OF THE PREFERRED EMBODIMENT

Figure 1:
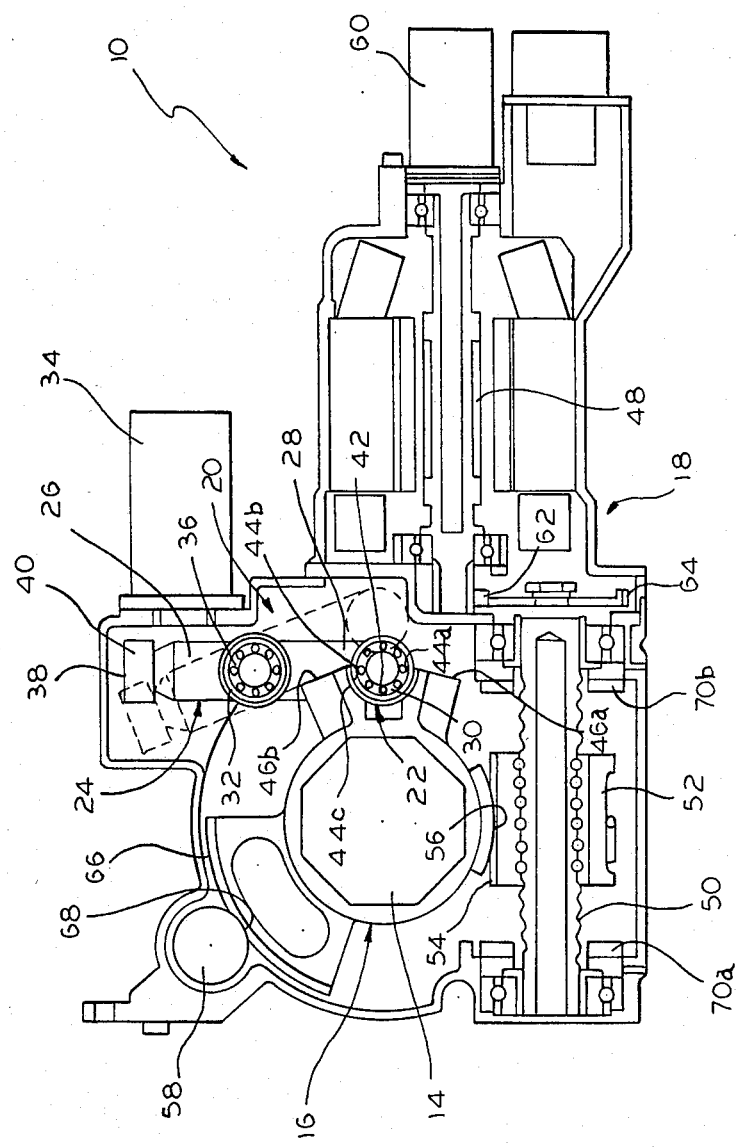
FIG. 1 is a cross-sectional view, partially schematic, of a flight control system in accordance with the present invention.
Figure 2:
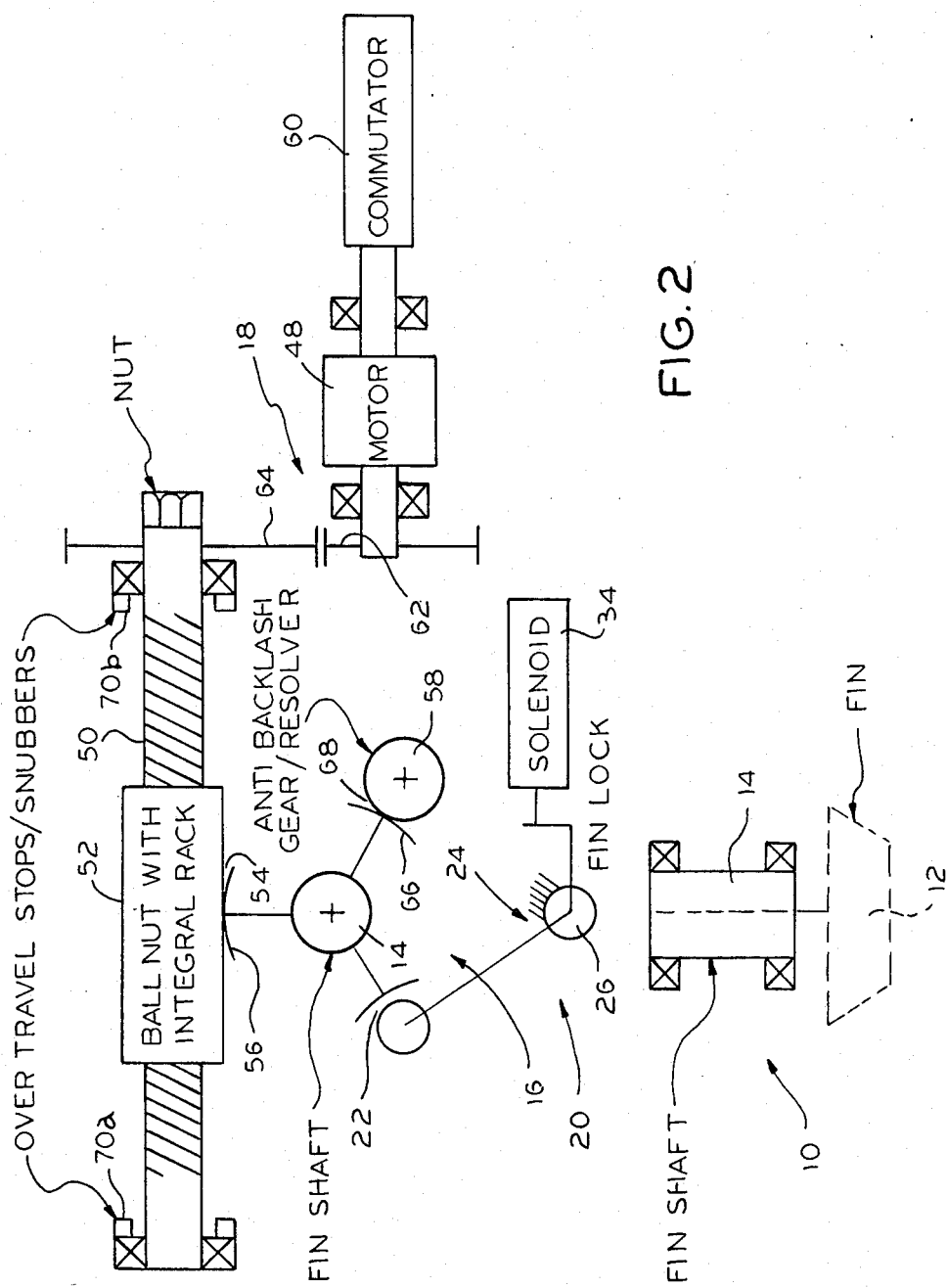
FIG. 2 is a schematic of the flight control system as illustrated in FIG. 1.

Referring to FIGS. 1 and 2, the flight control system 10 includes a control surface 12 carried by a shaft 14 within a shaft-receiving socket generally designated 16. The shaft 14 is operatively associated with the shaft-receiving socket 16 for rotational movement therewith. The flight control system 10 also includes means 18 for imparting rotational movement to the shaft 14 through the shaft-receiving socket 16 for moving the control surface 12 and means 20 for releasably locking the control surface 12 in a selected or null position. The releasable locking means 20 includes a detent 22 integral with the shaft-receiving socket 16 and latch means 24 mounted for pivotal movement into and out of locked engagement with the integral detent 22. With this construction, a system 10 for releasably locking and reversibly actuating a missile fin 12 has been provided.

Referring specifically to FIG. 1, the latch means 24 comprises a support beam 26 mounted for pivotal movement remote from one end 28 thereof. It also includes bearing means 30 operatively associated with the one end 28 thereof. As will be appreciated, the bearing means 30 is movable into and out of locked engagement with the integral detent 22 in low friction fashion.

In addition, the system 10 includes means 32 for normally biasing the support beam 26 such that the bearing means 30 is normally urged into locked engagement with the integral detent 22. Furthermore, the system 10 includes means 34 for selectively biasing the support beam 26 such that the bearing means 30 is selectively urged out of locked engagement with the integral detent 22.

As will be appreciated from FIG. 1, the normal biasing means 32 is a torsion spring and the selective biasing means 34 is a solenoid having a pair of coils of differing impedance, although a single coil solenoid can be used in many instances. The solenoid 34 is adapted to act against the biasing force of the torsion spring 32 to urge the bearing means 30 out of locked engagement with the integral detent 22 when the pair of coils is energized. The solenoid 34 also is adapted to act against the biasing force of the torsion spring 32 to maintain the bearing means 30 out of locked engagement with the integral detent 22. In accordance with the invention, the bearing means 30 is maintained out of locked engagement with the integral detent 22 with only the higher impedance of the coils energized.

As shown, the bearing means 30 is advantageously a needle roller bearing integral with the one end 28 of the support beam 26. It will also be seen that the support beam 26 is mounted for pivotal movement on bearing means 36 intermediate the ends 28 and 38 thereof. Still further, the support beam 26 has a counterweight as at 40 operatively associated with the end 38 thereof.

Still referring to FIG. 1, the integral detent 22 is disposed on the periphery of the shaft-receiving socket 16 and includes an opening 42 facing outwardly away from the shaft-receiving socket 16 defined by a pair of spaced parallel walls 44a and 44b interconnected by a semicylindrical surface 44c. Surfaces 46a and 46b extend from the outermost extremes of the walls 44a and 44b for engagement by the needle roller bearing 30 upon de-energizing the solenoid 34 in the event the control surface 12 is out of the selected or null position when the solenoid 34 is de-energized In this event, the needle roller bearing 30 can engage the surfaces 46a or 46b for rolling movement thereon in response to rotational movement of the shaft-receiving socket 16 until the control surface 12 is in the selected or null position when the needle roller bearing 30 will again be received in locked engagement within the integral detent 22.

As previously mentioned, the flight control system 10 is particularly well-suited for releasably locking and reversibly actuating control surfaces such as a missile fin. It will also be seen by referring to FIG. 2 that the movement imparting means 18 of the system 10 preferably includes a motor 48 operatively associated with a ballscrew 50 adapted to linearly translate the ballnut 52 and integral rack gear 54. Further, the movement imparting means 18 includes an integral socket sector gear 56 (see, also, FIG. 1) adapted to be driven by the rack gear 54.

Referring to both FIG. 1 and FIG. 2, the movement imparting means 18 also includes a position feedback resolver 58 and commutation resolver 60. The motor 48 has windings adapted to be excited in proper sequence by the position feedback resolver 58 and the commutation resolver 60, as will be appreciated by those skilled in the art. Additionally, the motor 48 is operatively associated with the ballscrew 50 through a pinion 62 and spur gear 64.

As shown in FIG. 1 and FIG. 2, a secondary sector gear 66 is integral with the shaft-receiving socket 16 is adapted to drive an anti-backlash gear 68 integral with the position feedback resolver 58. With this arrangement, the secondary sector gear 66 cooperates with the position feedback resolver 58 to relocate the control surface 12 in the selected or null position in relatively conventional fashion.

Referring specifically to FIG. 2, the system 10 includes an overtravel stop 70a and 70b associated with opposite ends of the ballscrew 50. The overtravel stops 70a and 70b are adapted to resist movement of the ballnut 52 in the event of a failure causing motor 48 to drive the ballnut 52 beyond preset limits. Advantageously, the overtravel stops 70a and 70b are formed of a compressible material to absorb dynamic energy of the ballnut 52.

When a missile utilizing the flight control system 10 is enabled, a voltage is supplied to the solenoid 34 which forces the support beam 26 into the position illustrated in phantom lines in FIG. 1. It will be appreciated that the solenoid acts against the end 38 of the support beam 26 having the counterweight 40 and that it lifts the needle roller bearing 30 from the integral detent 22 of the shaft-receiving socket 16. Simultaneously, a controller utilizes base information from the position feedback resolver 58 and the commutation resolver 60 to excite the windings of the motor 48 in the proper sequence. The torque of the motor 48 is applied to the ballscrew 50 through the pinion 62 and spur gear 64 which linearly translates the ballnut 52 and integral rack gear 54. By so doing, the integral rack gear 54 in turn drives the socket sector gear 56 thereby rotating the shaft-receiving socket 16 to provide proper motion to the control surface or fin 12 to complete the feedback loop. This operation is performed in flight as well as in preflight checks.

At the completion of a preflight check, to lock control surfaces for storage or to prevent wind damage while on the ground, the secondary sector gear 66 on the shaft-receiving socket 16 drives the anti-backlash gear 68 attached to the position feedback resolver 58 to relock the shaft-receiving socket 16. This happens because the control surface or fin 12 is first commanded to the null position at which point the solenoid is de-energized. When this occurs, the support beam 26 is released allowing the torsional spring 32 and counterweight 38 to reset the needle roller bearing 30 in the integral detent 22.

As will now be appreciated, the releasable locking means 20 is adapted to hold the control surface or fin 1 at the null position until it is released on command by a controller. The releasable locking mechanism 20 is also resettable and is of a corrosion resistant design. In the locked position, the needle roller bearing 30 is maintained in the integral detent 22 by the torsional spring 32 acting on the support beam 26.

As mentioned above, the solenoid 34 is constructed with two coils of differing impedance which are initially energized to unlock the control surface or fin 12 and, after the control surface or fin 12 is unlocked, the higher impedance coil remains energized to hold the needle roller bearing 30 and support beam 26 clear of the integral detent 22 while minimizing power dissipation. To relock the control surface or fin 12, it is moved by rotating the shaft 14, the solenoid 34 is de-energized, and the torsion spring 32 forces the needle-roller bearing 30 into the integral detent 22. If the control surface or fin 12 is not nulled when the solenoid 34 is de-energized, the needle roller bearing 30 will remain on one or the other of the surfaces 46a and 46b (depending upon the direction of initial rotation) and will roll therealong until it drops into the integral detent 22 when the control surface or fin 12 is finally returned to the null position.

While in the foregoing there has been set forth a preferred embodiment of the invention, it is to be understood that the invention is only to be limited by the spirit and scope of the appended claims.

I claim:

1. A flight control system, comprising:
a control surface carried by a shaft disposed within a shaft-receiving socket, said shaft being operatively associated with said shaft-receiving socket for rotational movement therewith;
means for imparting rotational movement to said shaft through said shaft-receiving socket for moving said control surface; and
means for releasably locking said control surface in a selected position including a detent integral with said shaft-receiving socket, said detent being rotatably movable with said shaft-receiving socket from said selected position corresponding to a null position for said control surface to an actuated position for said control surface, said releasable locking means also including latch means mounted for pivotal movement into and out of locked engagement with said integral detent when said control surface is in said null position.

2. The flight control system as defined by claim 1 wherein said latch means comprises a support beam mounted for pivotal movement remote from one end thereof, and including bearing means operatively associated with said one end thereof, said bearing means being movable into and out of engagement with said integral detent in low friction fashion.

3. The flight control system as defined by claim 2 including means for normally biasing said support beam such that said bearing means is normally urged into locked engagement with said integral detent, and including means for selectively biasing said support beam such that said bearing means is selectively urged out of locked engagement with said integral detent.

4. The flight control system as defined by claim 3 wherein said normal biasing means is a torsion spring and said selective biasing means is a solenoid having a pair of coils of differing impedance, said solenoid acting against said torsion spring to urge said bearing means out of locked engagement with said integral detent when said pair of coils is energized.

5. The flight control system as defined by claim 4 wherein said solenoid also acts against said torsion spring to maintain said bearing means out of locked engagement with said integral detent, said bearing means being maintained out of locked engagement with said integral detent with only the higher impedance of said coils energized.

6. The flight control system as defined by claim 2 wherein said bearing means is a roller bearing integral with sad one end of said support beam, said support beam being mounted for pivotal movement on bearing means intermediate the ends thereof, said support beam having a counterweight operatively associated with the other end thereof.

7. The flight control system as defined by claim 6 including a torsion spring normally urging said roller bearing into locked engagement with said integral detent and a solenoid selectively urging said roller bearing out of locked engagement with said integral detent, said solenoid having pair of coils of differing impedance and being adapted to act against said torsion spring to urge said roller bearing out of locked engagement with said integral detent when said pair of coils is energized.

8. The flight control system as defined by claim 7 wherein said solenoid also is adapted to act against said torsion spring to maintain said roller bearing out of locked engagement with said integral detent, said roller bearing being maintained out of locked engagement with said integral detent with only the higher impedance of said coils energized.

9. The flight control system as defined by claim 2 wherein said integral detent is disposed on the periphery of said shaft-receiving socket, said integral detent including an opening facing outwardly away from said shaft-receiving socket, said outwardly facing opening being defined by a pair of spaced, outwardly extending walls.

10. The flight control system as defined by claim 9 wherein said bearing means is a needle roller bearing integral with said one end of said support beam, said support beam being mounted for pivotal movement on bearing means intermediate the ends thereof, said support beam having a counterweight operatively associated with the other end thereof.

11. The flight control system as defined by claim 10 including a torsion spring normally urging said needle-roller bearing into locked engagement with said integral detent and a solenoid selectively urging said needle-roller bearing out of locked engagement with said integral detent, said solenoid having a pair of coils of differing impedance and being adapted to act against said torsion spring to urge said needle roller bearing out of locked engagement with said integral detent when said pair of coils is energized.

12. The flight control system as defined by claim 11 wherein said solenoid also is adapted to act against said torsion spring to maintain said needle roller bearing out of locked engagement with said integral detent, said needle roller bearing being maintained out of locked engagement with said integral detent with only the higher impedance of said coils energized.

13. The flight control system as defined by claim 12 wherein said solenoid engages the other end of said support beam having said counterweight, said torsion spring causing said support beam to pivot about said bearing means intermediate the ends thereof when said solenoid is de-energized, said torsion spring causing said needle roller bearing to be biased back into locked engagement with said integral detent.

14. The flight control system as defined by claim 13 including surfaces extending from the outermost extremes of each of said outwardly diverging walls for engagement by said needle roller bearing upon de-energizing said solenoid with said control surface out of said selected position, said needle roller bearing being adapted to engage said surfaces for rolling movement therealong in response to rotational movement of said shaft-receiving socket until said control surface is in said selected position when said needle-roller bearing is again received in said integral detent.

15. A system for locking and actuating a missile fin, comprising:

a shaft disposed within a shaft-receiving socket for carrying said fin, said shaft being operatively associated with said shaft-receiving socket for rotational movement therewith;

means for imparting rotational movement to said shaft through said shaft-receiving socket for moving said fin, said movement imparting means including a motor operatively associated with a ballscrew adapted to linearly translate a ballnut and integral rack gear, said movement imparting means further including an integral socket sector gear adapted to be driven by said rack gear; and means for releasably locking said fin in a selected position including a detent integral with said shaft-receiving socket, said releasable locking means also including latch means mounted for pivotal movement into and out of locked engagement with said integral detent.

16. The system for locking and actuating a missile fin as defined by claim 15 wherein said movement imparting means includes a position feedback resolver and commutation resolver, said motor having windings adapted to be excited in proper sequence by said position feedback resolver and commutation resolver and being operatively associated with said ballscrew through a pinion and spur gear mechanism.

17. The system for locking and actuating a missile fin as defined by claim 16 including a secondary sector gear integral with said shaft-receiving socket, said secondary sector gear being adapted to drive an anti-backlash gear integral with said position feedback resolver, said secondary sector gear cooperating with said position feedback resolver to relocate said control surface in said selected position.

18. The system for locking and actuating a missile fin as defined by claim 15 including an overtravel stop integrally associated with each of the opposite ends of said ballscrew, said overtravel stops being adapted to resist movement of said ballnut in the event of a failure causing said motor to drive said ballnut beyond preset limits, said overtravel stops being formed of a compressible material to absorb dynamic energy of said ballnut.

19. The system for locking and actuating a missile fin as defined by claim 17 wherein said latch means comprises a support beam mounted for pivotal movement remote from one end thereof, and including bearing means operatively associated with said one end thereof and movable into and out of engagement with said integral detent in low friction fashion.

20. The system for locking and actuating a missile fin as defined by claim 19 including means for normally biasing said support beam such that said bearing means is normally urged into locked engagement with said integral detent, and including means for selectively biasing said support beam such that said bearing means i selectively urged out of locked engagement with said integral detent.

21. The system for locking and actuating a missile fin as defined by claim 20 wherein said normal biasing means is a torsion spring and said selective biasing means is a solenoid, said solenoid having a pair of coils of differing impedance and being adapted to act against said torsion spring to urge said bearing means out of locked engagement with said integral detent when said pair of coils is energized.

22. The system for locking and actuating a missile fin as defined by claim 21 wherein said solenoid also is adapted to act against said torsion spring to maintain said bearing means out of locked engagement with said integral detent, said bearing means being maintained out of locked engagement with said integral detent with only the higher impedance of said coils energized.

23. The system for locking and actuating a missile fin as defined by claim 22 wherein said bearing means is a roller bearing integral with said one end of said support beam, said support beam being mounted for pivotal movement on bearing means intermediate the ends thereof and having a counterweight operatively associated with the other end thereof.

24. The system for locking and actuating a missile fin as defined by claim 23 wherein said integral detent is disposed on the periphery of said shaft-receiving socket, said integral detent including an opening facing outwardly away from said shaft-receiving socket and defined by a pair of generally parallel walls.

25. The system for locking and actuating a missile fin as defined by claim 24 wherein said solenoid engages the other end of said support beam having said counterweight, said torsion spring causing said support beam to pivot about said roller bearing intermediate the ends thereof when said solenoid is de-energized, said torsion spring causing said roller bearing to be biased into locked engagement with said integral detent.

26. The system for locking and actuating a missile fin as defined by claim 25 including surfaces extending from the outermost extremes of each of said generally parallel walls for engagement by said roller bearing upon deenergizing said solenoid with said fin out of said selected position, said roller bearing being adapted to engage said surface for rolling movement therealong in response to rotational movement of said shaft-receiving socket until said fin is in said selected position when said roller bearing is again received in said integral detent.

* * * * *